United States Patent [19]
Maloberti et al.

[11] Patent Number: 5,421,674
[45] Date of Patent: Jun. 6, 1995

[54] FLEXIBLE TUBULAR HANDLING CONDUIT, DEVICE AND PROCESS USING SUCH A CONDUIT

[75] Inventors: René Maloberti, Champigny; Alain Coutarel, Paris, both of France

[73] Assignee: Coflexip, France

[21] Appl. No.: 776,395

[22] PCT Filed: Apr. 2, 1991

[86] PCT No.: PCT/FR91/00260
§ 371 Date: Jan. 29, 1992
§ 102(e) Date: Jan. 29, 1992

[87] PCT Pub. No.: WO91/15694
PCT Pub. Date: Oct. 17, 1991

[30] Foreign Application Priority Data
Apr. 2, 1991 [FR] France .................. 90 04100

[51] Int. Cl.⁶ .................. F16L 1/16
[52] U.S. Cl. .................. 405/166; 405/169
[58] Field of Search .................. 405/154, 158, 166, 167, 405/168.1, 168.3, 168.4, 169, 170

[56] References Cited
U.S. PATENT DOCUMENTS
3,751,932 8/1973 Matthews, Jr.
3,777,499 12/1973 Matthews, Jr.

FOREIGN PATENT DOCUMENTS
0302784 2/1989 European Pat. Off.
2200470 4/1974 France.

OTHER PUBLICATIONS
R. Reynard et al, Prix des Techniciens du Petrole 1977 (Charles Bihoreau), "Les flexibles Coflexip . . . ", pp. 9–17.
International Search Report, Appl. No. PCT/FR91/00260, 14 Aug. 1991, European Patent Office.

*Primary Examiner*—David H. Corbin
*Attorney, Agent, or Firm*—Hoffman, Wasson & Gitler

[57] ABSTRACT

A device for laying flexible tubular conduits from a floating support is provided. The flexible tubular conduit has insulating sheaths and reinforcements where the conduit includes a recoverable flexible tubular handling conduit connected to the flexible tubular conduit. The flexible tubular handling conduit has sufficient mechanical strength to withstand the combined action of the highest internal pressure and the axial tensile force corresponding to the apparent weight in water of the length of tubular handling conduit which is suspended between the floating support and the floor, and on the other hand, the isolated action of the axial tensile force corresponding to the apparent weight in water of the length of flexible tubular conduit when the latter is suspended between the floating support and the floor by the flexible tubular handling conduit.

22 Claims, 6 Drawing Sheets

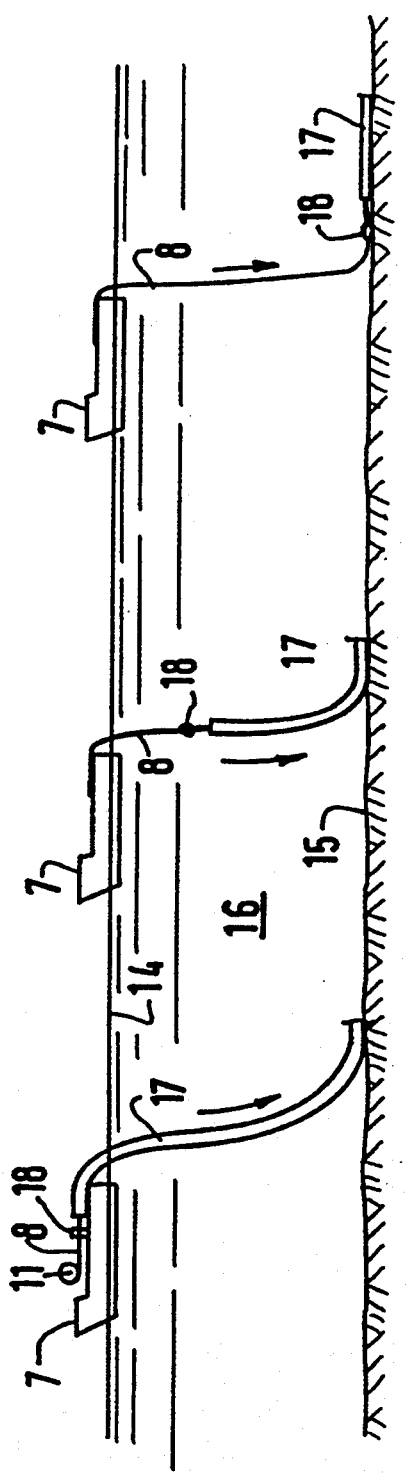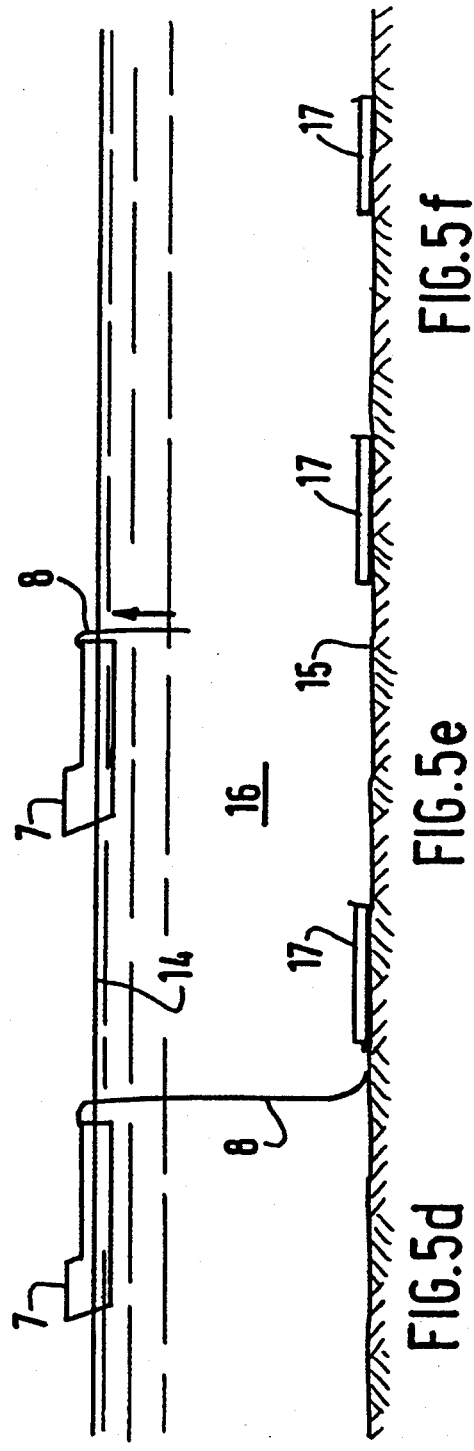

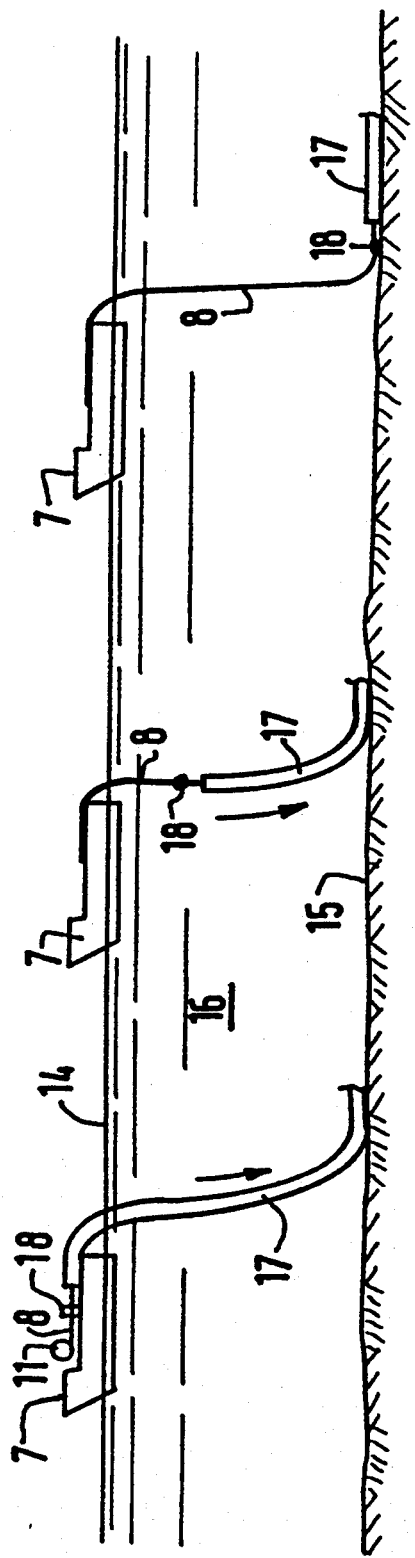
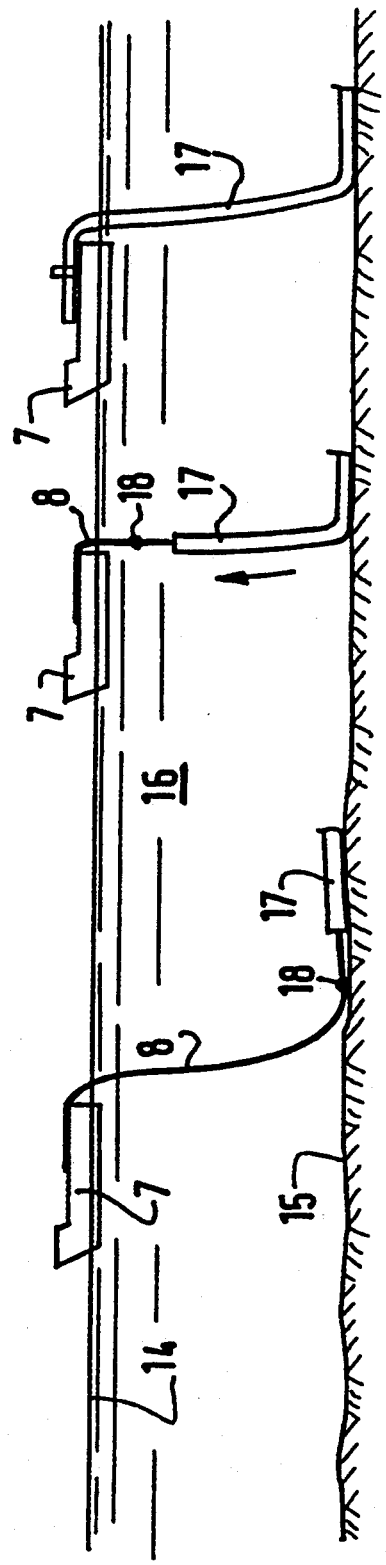

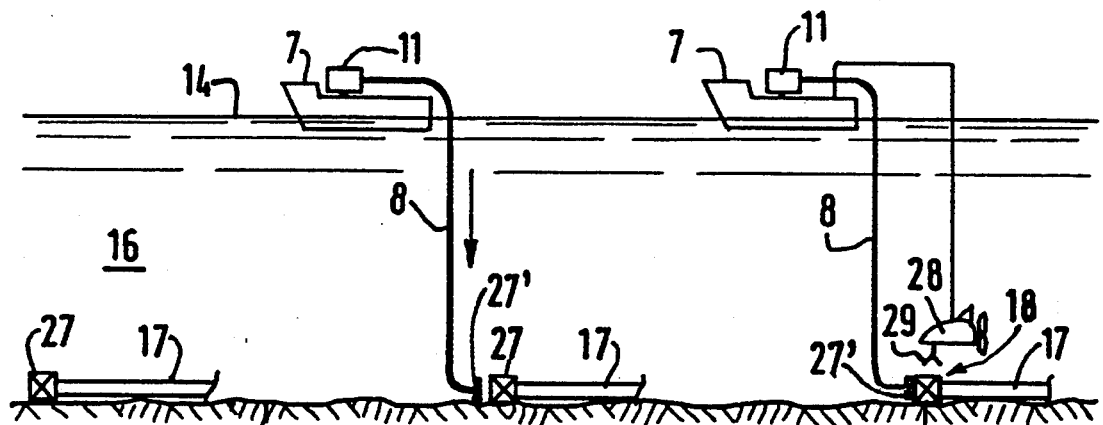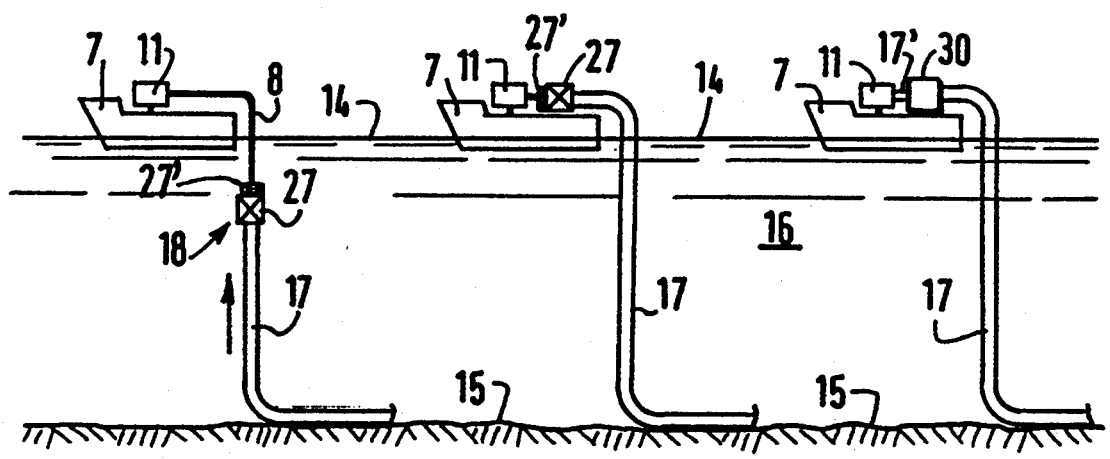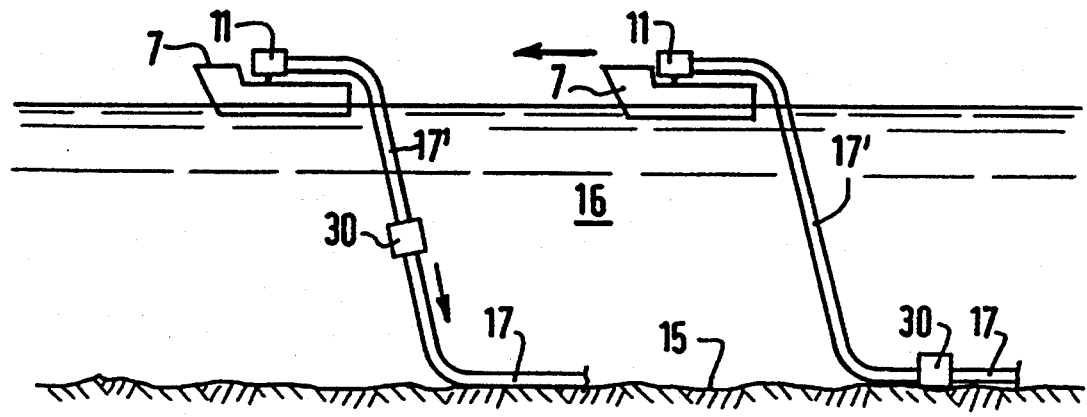

FLEXIBLE TUBULAR HANDLING CONDUIT, DEVICE AND PROCESS USING SUCH A CONDUIT

The invention relates mainly to a flexible tubular handling conduit, in particular for release, as well as a device and a process using such a conduit.

It is known to place flexible tubular conduits on the bottom of a body of water, such as, for example, the bottom of an ocean or the bottom of a lake, to transport a fluid. The transported fluid is, for example, water, liquid or gaseous hydrocarbons or air. Such flexible tubular conduits are described, for example, in French patent no. 83 16883 (published under number FR-A-2 553 859). The laying operations of such a flexible tubular conduit must be able to be interrupted in an emergency, for example, in a storm. This interruption is performed in a known way by using a winch unrolling a steel cable making it possible to lay on the floor one end of a portion of the flexible tubular conduit that was being laid.

This technique exhibits many drawbacks. It requires the presence of a winch able to support the weight of the flexible tubular conduit between the floor and the laying ship. This equipment is extremely bulky and expensive as soon as very shallow depths are exceeded. Moreover, no equipment of this type exists for great depths, for example, on the order of 1000 meters, at which flexible tubular conduits have not yet been laid.

According to this invention, a flexible tubular conduit is used to perform the quick release, on the ocean floor, of a flexible tubular conduit that was being laid. This release is performed to interrupt the work, for example in a storm, to make the ship laying the conduits free to maneuver, or at the end of the laying operation. After releasing, on the floor, of the flexible tubular conduit, whose laying has been interrupted, the raising of the flexible tubular release conduit is performed, for its use later. During such a procedure, as soon as the upper end of the flexible tubular conduit, whose laying has been stopped, has reached the floor, the separation of the two flexible tubular conduits is performed.

The conduit laid or released on the floor exhibits different technical characteristics from the flexible tubular handling conduit. According to this invention, it is possible to use a flexible tubular handling conduit in various handling operations. Each handling operation begins by connecting the flexible tubular handling conduit and ends by recovering the flexible tubular handling conduit for its use later on. In contrast with the standard flexible tubular conduit, the flexible tubular handling conduit is not an installation but a tool making it possible to perform various handling operations:

the release of a flexible tubular conduit;
the recovery of a released flexible tubular conduit;
the filling, for example with sea water, of the laid flexible tubular conduit;
the pressurization with a liquid, in particular with sea water, to perform the final test of a flexible tubular conduit, with its optional prior filling with sea water in the case where the flexible tubular conduit would have been laid filled with air;
performing an intermediate pressure test during the laying, the laid flexible tubular conduit being filled, in particular with sea water, with the raising of the end of the flexible tubular conduit laid on an ocean floor, aboard the laying ship which has reversed its direction;
intermediate pressurization when the flexible tubular conduit is laid filled with air. An at least partial filling of the flexible tubular conduit with a liquid, in particular sea water, is performed. Pressurization occurs to perform the test. Depressurization is performed. The handling hoses are raised, the laying ship moving back to perform the recovery. The flexible tubular conduit to be laid is emptied of liquid. And to finish, a new section of flexible tubular conduit is connected to continue the laying operations.

In another operating mode, as soon as the upper end of the flexible tubular conduit whose laying has been accomplished reaches the floor, the pipe can be filled with a fluid, for example water, the flexible tubular release conduit being connected to the surface equipment of the laying ship.

Of course, the laying of a flexible tubular conduit filled with a desired fluid, for example with pressurized fresh water, does not go outside the scope of this invention.

It is then possible to proceed to hydrostatic pressure resistance tests. This procedure is used when the pipe is completely laid and is to be checked under pressure and, on the other hand, by way of an intermediate test in case of repairs when an additional end fitting has been mounted on the flexible tubular conduit aboard the ship.

The use of a tubular conduit for placing another flexible tubular conduit on the floor exhibits numerous advantages. It makes possible the use of the equipment existing on the laying ship without resorting to special winches. There is used, for example, a tensioning means, intended for laying the flexible tubular conduit, for example, a tracked linear winch. Moreover, the laying with a view to release can be performed at all working depths, including for great depths on the order of 1000 meters. The release depth is limited only by the standard depth of the laying of flexible tubular conduits.

Under these conditions, the dimensioning of the main flexible tubular conduit is defined to withstand, on the one hand, only the stresses of its installation that are conditioned, in particular by its suspended weight without pressure, and, on the other hand, only the maximum pressure corresponding to the hydrostatic pressure tests, but never the combination of these two load cases. A considerable savings in the production cost of the main flexible tubular conduit results from this.

Advantageously, a flexible tubular conduit with a small diameter is used for the release. For example, a conduit of approximately 50 to 100 mm is used. The flexible tubular release conduit must be able to support a main tubular conduit to be laid, the latter able to have a large diameter. The flexible tubular conduit to be laid has, for example, an inner diameter equal to 101.6 mm, 152.5 mm, 228.6 mm, 406.4 mm or 609.6 mm, which corresponds respectively to 4, 6, 9, 16 and 24 inches. The ratio of the inner diameter between the release conduit and the conduit to be released is, for example, between 2 and 12, advantageously between 3 and 6. Thus, the flexible tubular release conduit, according to this invention, advantageously comprises reinforcements intended to improve its tensile strength whose number and/or thickness would not be justified by the fact of supporting the weight of the flexible tubular conduit itself, in combination with the resistance in pressure tests. For example, the thickness of the reinforcements crossed for tensile strength is increased and- /or the number of wire layers is increased, which goes, for example, from 2 to 4.

The use of flexible tubular release conduits according to this invention that have a small diameter reduces the cost of the latter as well as the room necessary for their storage.

Advantageously, the hydraulic connection of the flexible tubular conduits is separated from the mechanical connection between the flexible tubular conduit to be laid and the flexible tubular release conduit according to this invention. The separation of two flexible tubular conduits thus is facilitated. However, in particular in the cases where it is not desired to separate the two conduits on the floor, in particular in the cases of intermediate tests, it is possible to make a direct connection of the two conduits using, for example, end fittings and/or flanges. In this case, the same connection assures the mechanical and hydraulic connection of the two flexible tubular conduits.

The invention mainly has as its object a device for laying flexible tubular conduits, from a floating laying support, a flexible tubular conduit to be laid comprising insulating sheaths and reinforcements, characterized by the fact that it comprises a recoverable flexible tubular handling conduit, connected mechanically to said flexible tubular conduit to be laid, said flexible tubular handling conduit having sufficient mechanical strength to withstand, on the one hand, the combined action of the highest internal pressure which the flexible tubular conduit to be laid must withstand and the axial tensile force corresponding to the apparent weight in water of the length of the flexible tubular handling conduit which is suspended between the floating support and the floor, and, on the other hand, the isolated action of the axial tensile force corresponding to the apparent weight in water of the length of the flexible tubular handling conduit to be laid when the latter is suspended between the floating support and the floor by the flexible handling conduit, The invention also has as its object a device characterized by the fact that the separable mechanical attaching means comprise disconnecting elements able to be actuated at the ocean floor by mechanical control, The invention will be understood better by the following description and accompanying figures given as nonlimiting examples of which:

FIG. 1 is an exploded perspective view of a flexible tubular conduit of known type;

FIG. 2 comprises an exploded perspective view of flexible tubular release conduits according to this invention;

FIGS. 5a-5f are diagrams illustrating the principle of the release process according to this invention;

FIGS. 6a-6f are diagrams illustrating the principle of the testing process according to this invention;

FIGS. 8a-8h are diagrams illustrating the recovery process of a flexible tubular conduit according to this invention, In FIGS. 1 to 8, the same references have been used to designate the same elements.

Figure 1:
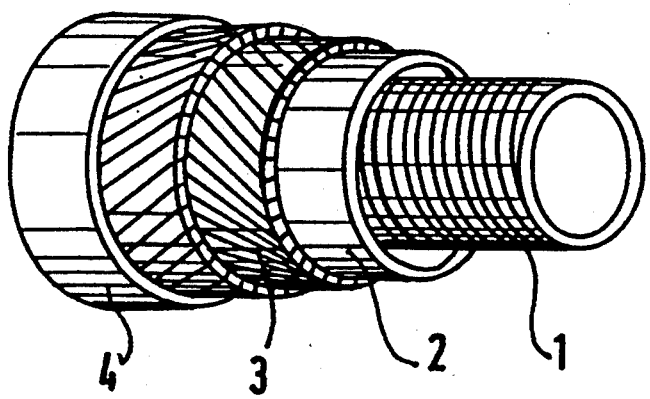

In FIG. 1, it is possible to see an example of a flexible tubular conduit of known type. It comprises an inner metal casing 1, surrounded by a plastic sheath 2, crossed reinforcements 3, an adhesive strip, not shown, and a plastic sheath 4.

The flexible tubular conduit of FIG. 1 can, for example, be used to convey water, gas or petroleum, for example, laid on an ocean floor. This type of conduit has never been laid in the deep sea, for example, at a depth of 1000 meters. However, if the applicant had to produce such a conduit, the inner diameter being 76.2 mm (3 inches), the conduit having to be able to withstand a maximum internal working pressure on the order of 280 bars and to be laid at a depth of 1000 m, the flexible tubular conduit would have a structure approximately analogous to that illustrated in FIG. 1.

The inner casing would have a thickness of 5 mm, the vault would have a thickness of 5 mm, the adhesive strip would have a thickness of 0.5 mm and plastic sheath 4 would have a thickness of 4.5 mm. Such a flexible tubular conduit would have a tensile strength in a straight line, according to the rules now accepted for characterizing the axial strength of a flexible conduit, on the order of 180 tons. By comparison, the flexible tubular handling conduit according to this invention illustrated in FIG. 2 of the same inner diameter has a tensile strength in a straight line on the order of 460 tons, when it is produced to be able to be used as a flexible tubular handling conduit to perform the various operations relative to the laying, through a water depth of 1000 meters, of a flexible tubular conduit having an inner diameter of 305 mm (12 inches) and having to withstand an internal working pressure of 180 bars. It will be noted that the maximum working pressure provided for the flexible handling conduit with a diameter of 26.2 mm, equal to 280 bars, corresponds to the test pressure of the flexible conduit to be laid which is set, as is usual, to 1.5 times the maximum working pressure.

By using the tubular handling conduit according to this invention, the linear cost of the flexible tubular conduit to be laid, which becomes lighter, is reduced. In the case where the flexible tubular conduit to be laid has, for example, an inner diameter of 305 mm (12 inches) and must withstand an internal pressure of 180 bars, it thus has been found that the process according to the invention makes it possible to lay, in a water depth of 1000 meters, such a flexible conduit whose weight could be limited to about 208 kg/m, the structure of the flexible conduit having to exhibit a mechanical strength conditioned, on the one hand, by the maximum working pressure of 180 bars, and on the other hand, by the suspended conduit weight corresponding to a water depth of 1000 meters, but not to the combination of these two load conditions of pressure and traction. Such a structure can easily be produced with the production means currently available. By comparison, the greatest water depth in which the same flexible tubular conduit with an inner diameter of 305 mm and a working pressure of 180 bars can be laid, as described above, is reduced by about half when said flexible conduit of 305 mm is laid according to the processes currently known, i.e., when it is subjected to the combined action of the axial load determined by the weight of the conduit suspended in a water depth corresponding to the laying depth, and of the maximum internal pressure, which is, in general, the test pressure, equal, for example, to 1.5 times the maximum working pressure. Moreover, for certain combinations of inner diameter and resistance to pressures, the main conduit intended to convey fluids would not be achievable with the current technologies. Actually, such a conduit would not be able to withstand simultaneously its apparent weight in water, suspended between the laying ship and the floor, and the nominal pressure of the pressure tests.

Figure 2:
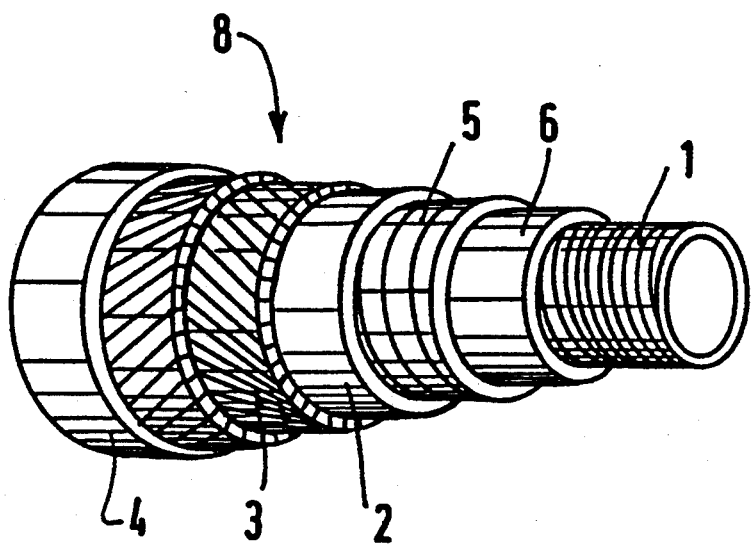

In FIG. 2, an embodiment of flexible tubular conduit 8 according to this invention can be seen. Tubular conduit 8 of FIG. 2a has an inner diameter approximately equal to 3 inches. This type of conduit makes it possible to convey a fluid, for example, for pressure resistance tests of a laid flexible tubular conduit.

Flexible tubular conduit 8 of FIG. 2 comprises an inner metal casing 1, a plastic sheath 6, a vault 5 to withstand pressure, a plastic sheath 2, a reinforcement unit 3, an outer plastic sheath 4. For a use at 1000 meters of depth with a maximum internal working pressure on the order of 280 bars (4000 psi according to English measurements), the inner casing will have a thickness approximately equal to 7.2 mm, plastic sheath 6 4.5 mm, pressure vault 5 6.2 mm; the group of reinforcements 3 comprising, for example, a first pair of reinforcement layers having a total thickness of 6 mm, covered by an adhesive strip having a thickness of 1.5 mm, and a second pair of reinforcement layers having a thickness of 7.2 mm. Adhesive strips of a thickness of 0.75 mm connect the outer reinforcements to plastic sheath 4 having a 4.5 mm thickness. The structure of the reinforcements as well as the adhesive strips have not been shown in FIG. 2. To withstand the tensile forces, it is possible, for example, to double the number of crossed reinforcements shown in FIG. 2 or to increase the thickness of the crossed reinforcements.

Figure 3:
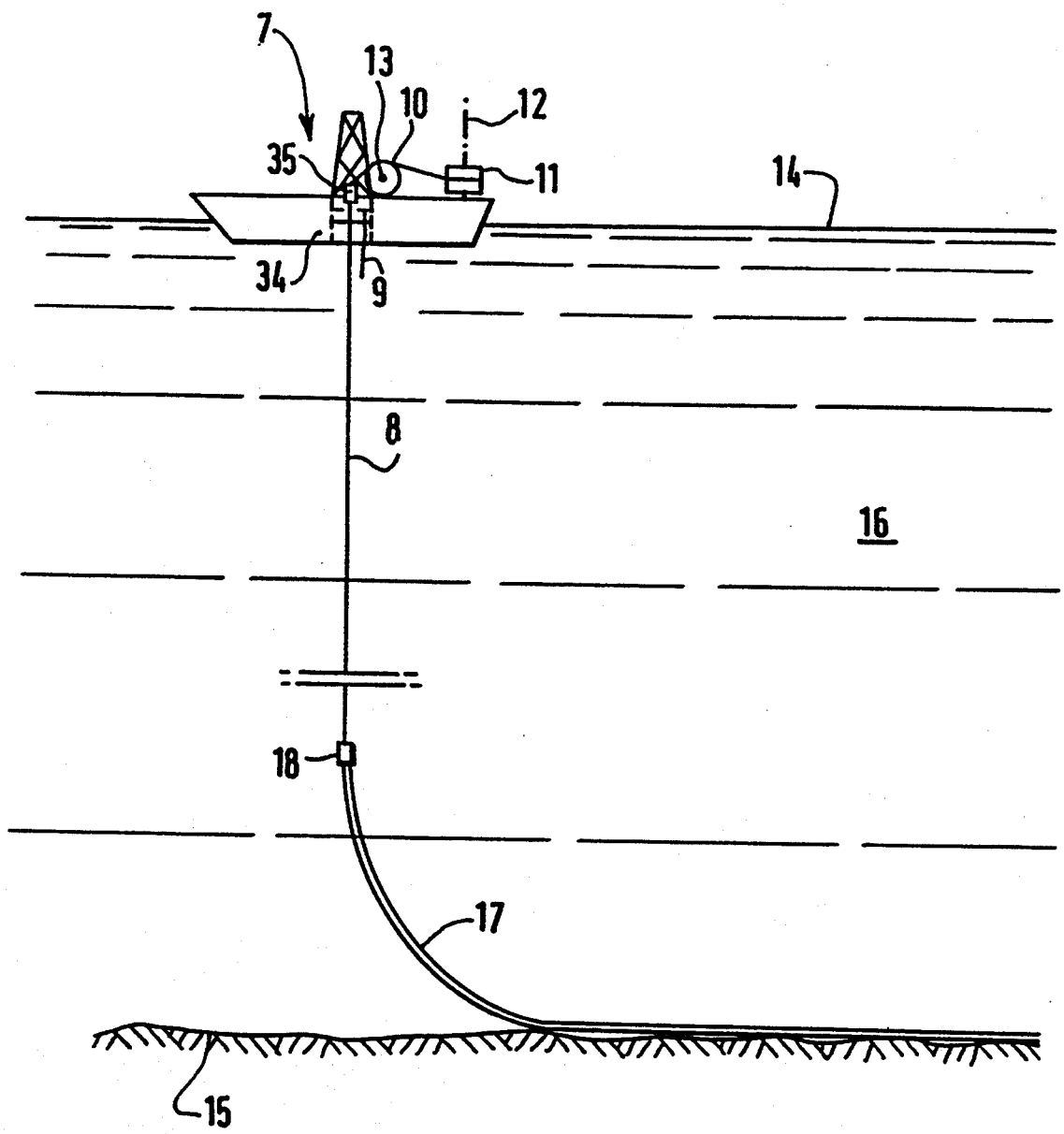
FIG. 3 is a diagram illustrating the use of the device according to this invention.

In FIG. 3, it is possible to see a ship 7 performing the descent for release or for tests of a flexible tubular conduit 17. The ocean carries reference 16, the surface of the water reference 14 and the floor reference 15.

Starting from floor 15, tubular conduit 17 to be laid or released, a device 18 for attaching to flexible tubular handling conduit 8 according to this invention, tensioning means 35, a guide wheel 10 with horizontal axis 13, a storage cage 11 with vertical axis 12, are found.

Advantageously, a winch which makes it possible to put a load in motion by applying a force to the tubular conduit is used as tensioning means 35.

Advantageously, the winch is of linear type, i.e., the conduit portion on which the winch exerts its action is straight. In other words, in a linear winch, the conduit is not subjected to any bending between the upstream area of the winch, where the conduit enters the winch with a first mechanical tension, and the downstream area of the winch, where the conduit leaves the winch, and where the axial tension in the conduit is greater than the mechanical tension at its entry.

Tensioning means 35 use, for example, a plurality of tracks. It is advantageous to use tensioning means 35 placed vertically downstream from guide wheel 10 and storage cage 11, which in this case do not have to undergo the mechanical tension due to the weight of tubular handling conduit 8 and flexible tubular conduit 17 to be laid. In a particularly advantageous example illustrated in FIG. 3, the laying or the release is performed through an opening 34 made inside the ship and communicating with ocean 16. Such an opening 34 is called "moon pool" in English terminology. Advantageously, a work table 9 is placed inside moon pool 34 downstream from tensioning means 35 making possible the manipulation or the handling of flexible tubular conduits 8 and/or 17.

Figure 4:
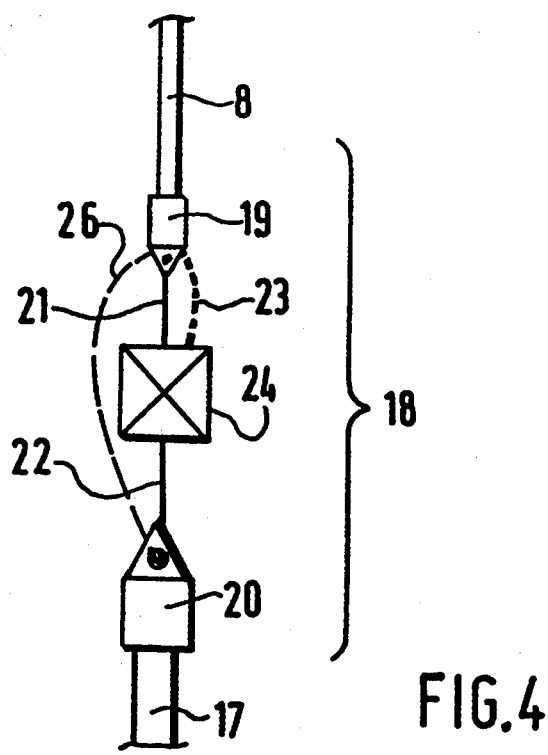
FIG. 4 is a schematic diagram of the connecting device between two flexible tubular conduits.

In FIG. 4, it is possible to see an example of an attaching device 18 between a tubular conduit 8 according to this invention, and a flexible tubular conduit 17 to be laid. Attaching device 18 comprises an end fitting 19 mounted at the end of tubular conduit 8, a mechanical connection 21, a disconnecting device 24, a mechanical connection 22 and an end fitting 20 mounted at the end of flexible tubular conduit 17. Moreover, in the case where it is desired to be able to perform the disconnection, device 18 further advantageously comprises a connection 23 providing a control signal to disconnecting device 24. Connection 23 is, for example, a hydraulic connection. The production of an optional hydraulic connection 26 of flexible tubular conduits 8 and 17 does not go outside the scope of this invention.

It is possible, once the laying operations are ended, optionally to perform the hydrostatic pressure resistance test.

Disconnecting device 24 comprises, for example, a clamp comprising a large lever arm. For example, a controlled submarine vehicle performs the cutting of a closing line, for example, of the cable type, the small diameter preventing the separation of two lever arms and, consequently, of the jaws of the clamp.

In a variant embodiment, the closing is assured by an electromagnetic device, for example, of the electromagnetic type, or the hydraulic type, for example, of cylinder type.

In FIG. 5, the release operations of flexible tubular conduit 17 that is being laid have been illustrated diagrammatically in FIG. 5a. The connection is performed by attaching device 18 of flexible tubular conduit 8 at the end of flexible tubular conduit 17.

As illustrated in FIG. 5b, the unit of flexible tubular conduit 8 and flexible tubular conduit 17 is lowered until, as illustrated in FIG. 5c, tubular conduit 17 rests entirely on floor 15. At that moment, as illustrated in FIG. 5d, the disconnection is performed between flexible tubular conduits 8 and 17. For this purpose, disconnecting device 24 of device 18 is actuated. This disconnection can be either reversible or irreversible depending on the desired future handling and depending on the urgency of the intervention. Flexible tubular conduit 8 is raised to ship 7, as illustrated in FIG. 5f. From that moment, ship 7 can take shelter, in a port, or can go intervene at another more urgent site, flexible tubular conduit 17 resting on the floor, as illustrated in FIG. 5g.

Considering the risk of pollution that a leak, for example, of a pipeline, can represent, an absolute reliability of the flexible tubular conduits is to be required. Therefore, tests, in particular the test of resistance to the internal pressure of flexible tubular conduit 17, are performed, for example, following a line repair and/or a mounting of an additional end fitting, and/or at the end of the laying operation. This procedure is illustrated in FIG. 6.

In FIG. 6a, a flexible tubular conduit 8, advantageously with a small diameter, is attached to the end of flexible tubular conduit 17 to be tested, by a device 18.

In FIG. 6b, the descent of flexible tubular conduits 8 and 17 has been illustrated. Only when flexible tubular conduit 17 rests entirely on the floor, as illustrated in FIG. 6c, is it possible to perform the pressurization and the test, if necessary after filling of the flexible tubular conduit. Thus, it is possible to test tubular conduit 17 which undergoes only the stresses due to the pressure that it must be able to support and not the stresses due to the tension induced by its weight, the conduit being unrolled vertically.

As illustrated in FIG. 6c, the depressurization of tubular conduits 8 and 17 is assured. It is possible to raise, as illustrated in FIG. 6f, tubular conduits 8 and 17 aboard ship 7. As soon as the end of tubular conduit 17 has reached the ship, it is possible to continue the desired operations. For example, if tubular conduit 17 successfully passed the test, a new section of tubular conduit 17 is connected, and the laying operations are continued.

Figure 7:
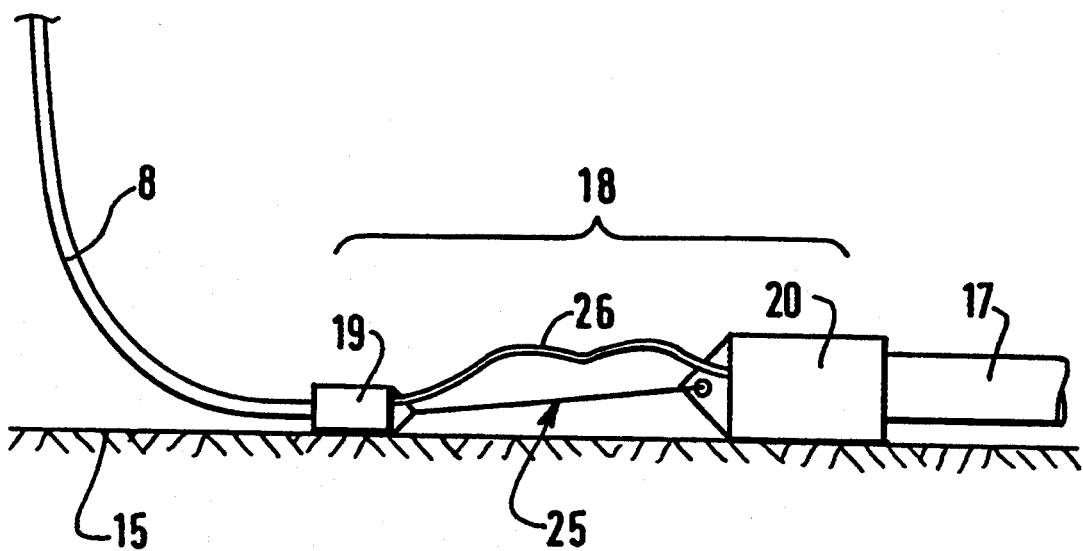
FIG. 7 is a diagram illustrating the connection between two flexible tubular conduits used in a testing procedure.

The testing procedure is not necessarily followed by a disconnecting stage, on the floor, of tubular conduits 8 and 17. Thus, a variant embodiment of attaching device 18 for the test is illustrated in FIG. 7. A mechanical connection, without the possibility of separation, assures the coupling of flexible tubular conduits 8 and 17. The mechanical connection is assured, for example, by a cable 25 of great diameter. A hydraulic connection 26 is necessary to be able to perform the pressurization of tubular conduit 17.

Hydraulic connection 26 is advantageously of a length clearly greater than the length of mechanical connection 25. Thus, the risk of breaking the hydraulic connection is limited.

In FIG. 8, the procedure of resuming the laying has been illustrated. In FIG. 8a, the end of a flexible tubular conduit 17 released on the floor is found. This situation corresponds, for example, to the case of FIG. 5g. For resuming the laying, the end of flexible conduit 17 is advantageously equipped with a connecting unit 27 optionally supplemented by means facilitating its being located by a sonar. Such a unit 27 comprises, for example, a connecting part 24 released with the flexible tubular conduit connected by a mechanical connection 22, advantageously a flexible mechanical connection to an end fitting 20 mounted at the end of flexible tubular conduit 17. In a variant embodiment, flexible tubular conduit 8 is equipped with a connecting device 27'. It comprises, for example, an end fitting and the device for diameter adaptation of the end fitting making possible a connection between device 27 and 27' to form a device 18 for attaching the two flexible tubular conduits. The active sonar marker emits acoustic waves. The passive sonar marker, by reflecting the acoustic waves emitted by a sonar, for example from a ship or a remote-controlled submarine vehicle (ROV) 28, facilitates the locating of the end of the flexible tubular conduit. Laying ship 7 lowers a flexible tubular conduit 8 as illustrated in FIG. 8b. Flexible tubular conduit 8 is connected, as illustrated in FIG. 8c, for example, by devices 7 and 27' to flexible tubular conduit 17. This connection is performed, either by remote control or with the help of a manipulating arm 29 of remote-controlled submarine vehicle 28.

In FIG. 8d, the raising of flexible tubular conduits 8 and 17 has been illustrated.

Once the end of tubular conduit 17 is aboard ship 7, as illustrated in FIG. 8e, the disconnection of tubular conduits 8 and 17 is performed.

As illustrated in FIG. 8f, the connection of end 30 of tubular conduit 17 with an end of an additional section of tubular conduit 17' to be laid is performed.

From that moment, the usual operations of laying flexible tubular conduits are continued. As illustrated in FIG. 8g, tubular conduits 17 and 17' are laid on the floor. In FIG. 8h, it is possible to see the laying of tubular conduit 17', a connection 30 between conduits 17' and 17 already being laid on the floor. Laying ship 7 continues its advance, as illustrated in FIG. 8h, until achieving the complete laying of flexible tubular conduits desired.

The invention applies in particular to the operations for handling flexible conduits on the ocean floor.

The invention mainly applies to laying flexible tubular conduits for the running of pipelines for deep sea transport of hydrocarbons on the floor whose depth is close to one thousand meters.

We claim:

1. Device for laying flexible tubular conduits on an ocean floor from a floating laying support, a flexible tubular conduit to be laid comprising sheaths and reinforcements, wherein said laying device comprises a recoverable flexible tubular handling conduit, connected mechanically to said flexible tubular conduit to be laid, said flexible tubular handling conduit having sufficient mechanical strength to withstand a combined action of a highest internal pressure which said flexible tubular conduit to be laid will be subjected to, and an axial tensile force corresponding to an apparent weight in water of a length of said flexible tubular handling conduit which is suspended between said floating support and said ocean floor, and, withstand isolated action of axial tensile force corresponding to an apparent weight in water of a length of said flexible tubular conduit to be laid suspended between said floating support and said ocean floor by said flexible handling conduit.

2. Device according to claim 1, further comprising tensioning means to assure the handling and absorption of tensile forces on said flexible tubular conduit to be laid, and on said flexible tubular handling conduit, said tensioning means being of linear winch type.

3. Device according to claim 1, wherein it comprises a hydraulic connection connecting flexible tubular conduit to be laid to flexible tubular release conduit.

4. Device according to claim 3, wherein the mechanical attaching means of two flexible tubular conduits are separated from the hydraulic connection of these two flexible tubular conduits.

5. Device according to claim 1, further comprising mechanical attaching means separable in a first part integral with flexible tubular conduit to be laid and a second part integral with flexible tubular handling conduit.

6. Device according to claim 4, wherein the separable mechanical attaching means comprise disconnecting elements able to be actuated at the ocean floor by mechanical control.

7. Device according to claim 4, wherein the separable mechanical attaching means comprise disconnecting and/or reconnecting elements able to be actuated at the ocean floor by mechanical control.

8. Device according to claim 6, wherein the operation of said disconnecting or reconnecting elements is assured by remote control acting on the mechanical control elements.

9. Device according to claim 8, wherein the remote control is of hydraulic type by the action of the pressure in the fluid contained in flexible tubular handling conduit in connection with the attaching means.

10. Device according to claim 8, wherein it comprises a sonar type acoustic remote control signal receiver.

11. Process of handling flexible tubular conduits on an ocean floor from a floating support having a step of using a recoverable flexible tubular handling conduit of sufficient mechanical strength to withstand a combined action of a highest internal pressure which said flexible tubular conduit to be laid will be subjected to, and an axial tensile force corresponding to an apparent weight in water of a length of said tubular handling conduit which is suspended between said floating support and said ocean floor, and, withstand isolated action of the axial tensile force corresponding to an apparent weight in water of a length of said flexible tubular conduit to be laid Suspended between said floating support and said ocean floor by said flexible handling conduit, said process comprising the successive steps of:

a.) connecting one end of said flexible tubular handling conduit to a free and accessible end of said flexible tubular conduit to be laid;

b.) assuring, by tensioning means installed on said floating support, a longitudinal displacement of said flexible tubular handling conduit, so that said free end of said flexible tubular conduit to be laid, connected to a said flexible tubular handling conduit, vertically clears the height of a section of water, a weight of said flexible tubular conduit to be laid remaining supported by said flexible tubular handling conduit, c.) disconnecting said flexible tubular handling conduit from said free end of said flexible tubular conduit to be laid, d.) recovering said flexible tubular handling conduit for a later use.

12. Process of handling according to claim 11, wherein same tensioning means are used to assure the handling and the absorption of tensile forces of said flexible tubular conduit to be laid, and of said flexible tubular handling conduit, said tensioning means being of linear winch type.

13. Process of handling flexible tubular conduits according to claim 11, wherein step (a) is preceded by a preliminary step comprising stopping said floating support, wherein Step (a) comprises, connecting said flexible tubular conduit and said flexible tubular handling conduit aboard said floating support, wherein step (b) comprises unrolling said flexible handling conduit to said ocean floor, from said floating support, said free end of said flexible tubular conduit to be laid is suspended from said flexible handling conduit, wherein said disconnecting step (c) is performed on said ocean floor, and wherein step (d) is preceded by lifting said flexible tubular handling conduit aboard said floating support.

14. Process of handling a flexible tubular conduit on an ocean floor according to claim 11 wherein step (a) is preceded by a preliminary step of lowering to said ocean floor an end of said flexible tubular handling conduit to be connected, wherein step (a) comprises connecting said end of said flexible tubular handling conduit with said free end of said flexible tubular conduit, wherein step (b) comprises raising said free end of said flexible tubular conduit aboard said floating support, said flexible tubular conduit remaining suspended from said flexible tubular handling conduit while said flexible tubular handling conduit is held and raised by tensioning means and wherein step (c) comprises performing disconnection aboard said floating support.

15. Process of handling flexible tubular conduits according to claim 11, wherein connection between said flexible tubular conduit to be laid and said flexible tubular handling conduit comprises a hydraulic connection connecting inner conduits of said flexible tubular conduit and said flexible tubular handling conduit.

16. Process of handling flexible tubular conduits according to claim 15, wherein step (a) is preceded by preliminary step comprising unrolling and laying partially on said ocean floor said flexible tubular conduit to be laid, said flexible tubular conduit being full of water, and stopping progression of Said floating laying support and said unrolling of said flexible tubular conduit, said free end remaining accessible aboard said floating support, wherein Step (a) comprises connecting said flexible tubular conduit and said flexible tubular handling conduit aboard said floating support, wherein step (b) comprises unrolling and lowering said flexible handling conduit until a free end of said flexible tubular conduit rests on said ocean floor step (b) being followed by two intermediate steps of pressurizing, to a pressure determined for testing, liquid contained in said flexible tubular conduit previously filled with liquid, then continuing said test under pressure for a given period to check integrity and conformity of said flexible tubular conduit to be laid, wherein step (c) comprises separating said flexible tubular conduit and said flexible tubular handling conduit on said ocean floor, and wherein step (d) is preceded by a step of lifting said flexible tubular handling conduit aboard said floating support.

17. Process of handling flexible tubular conduits according to claim 15, wherein step (a) is preceded by preliminary steps of unrolling and laying, partially on said ocean floor, said flexible tubular conduit to be laid, said flexible tubular conduit being laid full of liquid, then stopping progression of said floating support and unrolling of said flexible tubular conduit, so that a free end remains accessible aboard said floating support, wherein step (a) comprises performing connection of said flexible tubular conduit and said flexible tubular handling conduit aboard said floating support, wherein step (b) comprises unrolling and lowering said flexible handling conduit until said free end of said flexible tubular conduit rests on said ocean floor, step (b) being followed by two intermediate steps of pressurizing, to a certain pressure determined for testing, liquid contained in said flexible tubular conduit as well and in said flexible tubular handling conduit previously filled with liquid, the continuing testing under pressure for a given period to check integrity and conformity of said flexible tubular conduit to be laid, wherein step (c) is preceded by intermediate steps of depressurizing, said flexible tubular conduit and said flexible tubular handling conduit then lifting said flexible handling conduit with tensioning means, said flexible tubular conduit to be laid remaining suspended from said flexible tubular handling conduit, and wherein step (c) comprises disconnecting said flexible tubular conduit and said flexible tubular handling conduit aboard said floating support.

18. Process of handling according to claim 11, wherein said flexible tubular conduit to be laid is unrolled and laid without being filled with liquid, thus remaining full of air and wherein, prior to step (c), a preliminary step has been performed, comprising filling with liquid said flexible tubular conduit to be laid and said flexible tubular handling conduit.

19. Process of handling according to claim 18, wherein said preliminary step (b).

20. Process of handling flexible tubular conduits according to claim 15, said flexible tubular conduit (17) to be laid being unrolled and laid full of air, wherein prior to testing under pressure, said flexible tubular conduit is filled with liquid, wherein step (a) is preceded by preliminary steps of unrolling and placing, partially on said ocean floor, said flexible tubular conduit to be laid, the stopping advance of said floating support and unrolling of said flexible tubular conduit, a free end remaining accessible aboard said floating support, wherein step (a) comprises connecting said flexible tubular conduit and said flexible tubular handling conduit aboard said floating support, wherein step (b) comprises unrolling and lowering said flexible tubular handling conduit until said free end of said flexible tubular conduit rests on said ocean floor and wherein step (b) is followed by two intermediate pressurizing, to a pressure determined for testing liquid contained in said flexible tubular conduit and said flexible tubular handling conduit previously filled with liquid, then continuing testing under pressure for a given period to check integrity and conformity of said flexible tubular conduit to be laid, wherein step (c) comprise, separating said flexible tubular conduit and said flexible tubular handing conduit on said ocean floor, and wherein step (d) is preceded by lifting flexible tubular handling conduit aboard said floating support.

21. Process of handling flexible tubular conduits according to claim 15, said flexible tubular conduit to be laid being unrolled and laid full of air, wherein prior to testing under pressure, said flexible tubular conduit is filled with fluid wherein step (a) is preceded by preliminary steps of unrolling and laying, partially on said ocean floor, said flexible tubular conduit to be laid, then stopping advance of said floating support and unrolling of said flexible tubular conduit, said free end remaining accessible aboard said floating support, wherein step (a) comprises connecting said flexible, tubular conduit and said flexible tubular handling conduit aboard said floating support, wherein step (b) comprises unrolling and lowering said flexible handling conduit until said free end of said flexible tubular conduit rests on said ocean floor, and of pressurizing, to a pressure determined for testing, liquid contained in said flexible tubular and said flexible tubular conduit handling conduit having been previously filled with liquid, then continuing the test testing under pressure for a given period to check integrity and conformity of said flexible tubular conduit to be laid, wherein Step (c) is preceded by intermediate steps of depressurizing said flexible tubular conduit and said flexible tubular handling conduit, then lifting said flexible tubular handling conduit, and wherein step (c) comprises disconnecting said flexible tubular conduit and said flexible tubular handling conduit aboard said floating support.

22. Process of handling according to claim 11, wherein a ratio of an inner diameter of said flexible tubular conduit to be laid and said flexible tubular handling conduit is between 3 and 8.

* * * * *